(12) United States Patent
Gorell

(10) Patent No.: US 9,026,420 B2
(45) Date of Patent: May 5, 2015

(54) METHOD AND SYSTEM OF UPDATING A GEOCELLULAR MODEL

(75) Inventor: Sheldon B. Gorell, Katy, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 13/995,235

(22) PCT Filed: Jan. 13, 2011

(86) PCT No.: PCT/US2011/021058
§ 371 (c)(1),
(2), (4) Date: Jun. 18, 2013

(87) PCT Pub. No.: WO2012/096663
PCT Pub. Date: Jul. 19, 2012

(65) Prior Publication Data
US 2013/0282349 A1    Oct. 24, 2013

(51) Int. Cl.
*G06G 7/48* (2006.01)
*G01V 1/40* (2006.01)
*G01V 99/00* (2009.01)

(52) U.S. Cl.
CPC . *G01V 1/40* (2013.01); *G01V 99/00* (2013.01)

(58) Field of Classification Search
USPC ........................................................... 703/10
See application file for complete search history.

(56) References Cited

U.S. PATENT DOCUMENTS

| | | | |
|---|---|---|---|
| 5,838,634 A | 11/1998 | Jones et al. | |
| 5,905,657 A | 5/1999 | Celniker | |
| 6,549,854 B1 | 4/2003 | Malinverno et al. | |
| 7,254,091 B1* | 8/2007 | Gunning et al. | ................ 367/73 |
| 2009/0248378 A1 | 10/2009 | Dachang et al. | |

OTHER PUBLICATIONS

Gorell: Creating 3-D Reservoir Models Using Areal Geostatistical Techniques Combined with Vertical Well Data; SPE 29670; 1995; pp. 547-556.*
Behrens et al.; Incorporating Seismic Attribute Maps in 3D Reservoir Models; SPE Reservoir Evaluation & Engineering, 1998; pp. 122-126.*
Doyen et al.; Reconciling Data at Seismic and Well Log Scales in 3-D Earth Modeling; SPE 38698; 1997; pp. 465-474.*
Villegas et al.; Permeability Updating of the Simulation Model Using 4D Seismic Data; SPE 125632; 2009; pp. 1-7.*
Search Report; Australian Patent Office;Aug. 16, 2013; pp. 1-4.*
International Search Report and Written Opinion issued Oct. 21, 2011 in International Application No. PCT/ US2011/021058 filed Jan. 13, 2011., 8 pages.

* cited by examiner

*Primary Examiner* — Hugh Jones (57) ABSTRACT

Updating a geocellular model. At least some of the illustrative embodiments are methods including: modifying a geocellular model of an earth formation based on an actual datum from an actual borehole, the modifying by: selecting a plurality of cells to be removed from the geocellular model; interpolating to determine a new surface using data associated with cells to be removed, data associated with cells not selected for removal, and the actual datum from the actual borehole; and calculating data associated with new cells that replace the cells to be removed, the new cells with locations relative to the new surface.

23 Claims, 7 Drawing Sheets

METHOD AND SYSTEM OF UPDATING A GEOCELLULAR MODEL

CROSS-REFERENCE TO RELATED APPLICATIONS

None

BACKGROUND

In order to optimize borehole placement and hydrocarbon extraction from an underground formation, a model of the formation may be created. Using the model, an analyst may perform simulations to find the optimal extraction parameters. For example, using the model an analyst may run simulations with varying parameters such as injection well placement, extraction well placement, and type and volume of secondary recovery fluid injection.

Formation models are created by a software package, where the software package creates the model from data such as various horizons (e.g., the top and bottom of the formation as determined by seismic surveys), location of faults within the formation, and actual depths of the formation as determined by exploratory boreholes drilled into the formation. The software package creates the formation model in the form of a plurality of individual cells, where the cells taken as a group model the overall extent of the actual underground formation. Each cell "contains" data relevant to the formation at the respective location of the cell (e.g., porosity, permeability, initial hydrocarbon saturation).

The software package used to create the model and the model are different entities. One can run simulations using the model without having access to the software package or the data used to create the model. A difficulty thus arises in the situation where a user obtains data that indicates the model may not accurately reflect the actual formation. For example, an additional borehole is drilled, and the top of the formation at the location of the additional borehole is determined to be a particular depth that is different than a depth indicated by the model. When one does not have access to the software package that created the model, or the time to wholly recreate the model using the newly acquired data, updates to the model which accurately reflect the underground formation are difficult.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Surface", with respect to a geocellular model, shall mean a representation of a portion of a geological boundary where the surface is defined by an array of data points that directly or indirectly indicates a horizontal location and depth of the surface.

"Horizon" shall mean a geological boundary used to create a geocellular model.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods and related systems to modify a geocellular model based on newly acquired actual data (e.g., newly acquired data from an actual borehole). The modifications of most interest in this application are regional modifications (i.e., only a small region of the overall geocellular model). The regional scale modification may be performed in situations where an analyst either does not have access to the software package used to create the geocellular model, or the analyst does not have time to involve the various disciplines (e.g., geo-statisticians, geophysicists) employed to recreate the entire geocellular model based on the newly acquired data.

Figure 1:
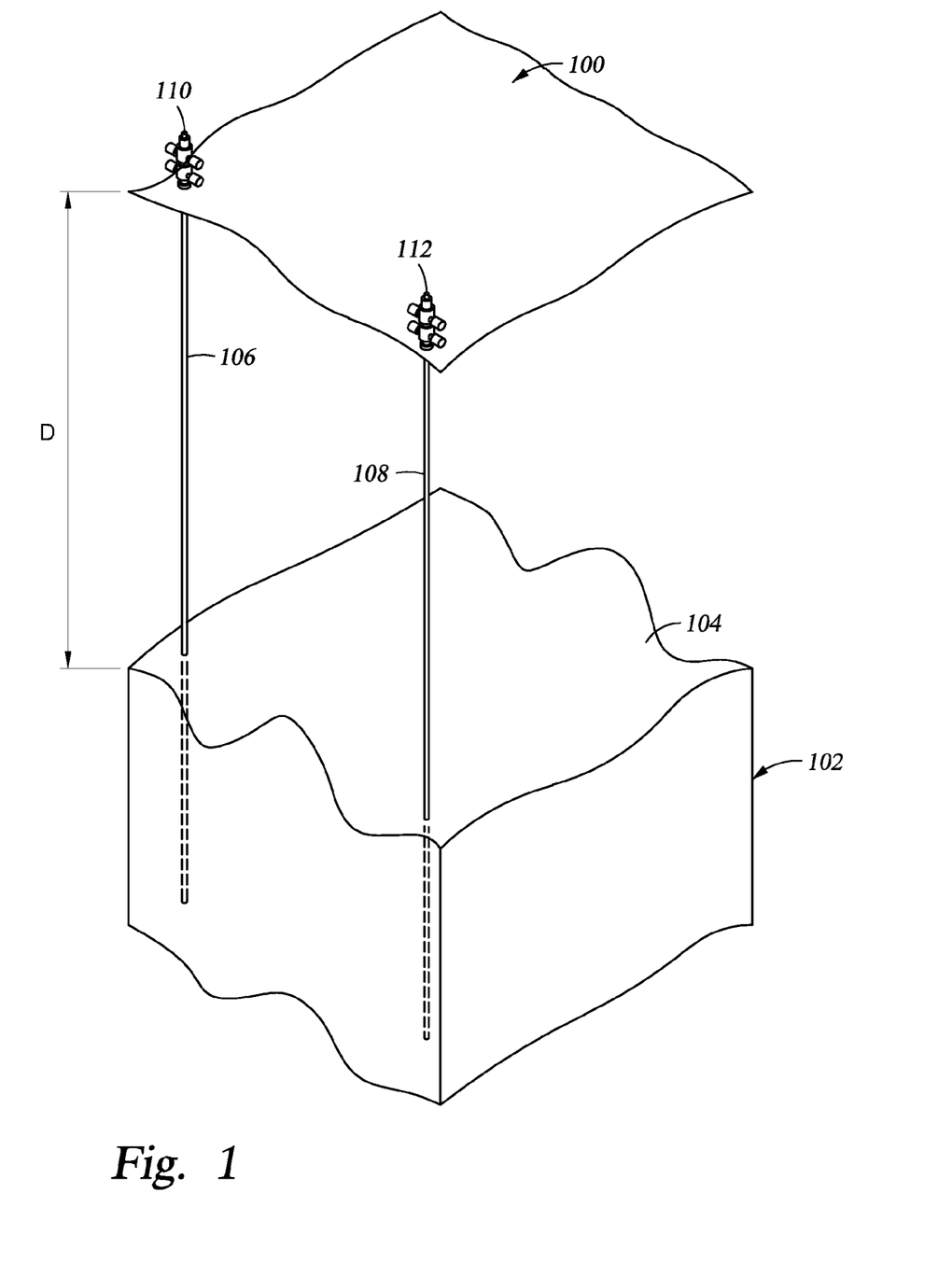
FIG. 1 shows a perspective view of a underground formation in accordance with at least some embodiments.

FIG. 1 shows a cross-sectional perspective view of a portion of the face of the earth as well as an underlying formation. In particular, FIG. 1 shows a portion of the face of the earth 100 (hereafter just "face") and an underlying hydrocarbon bearing formation 102 (hereafter just "formation 102"). The formation 102 resides at some distance or depth D below the surface, and the overburden between the surface 100 and the top 104 of the formation 102 is not shown in FIG. 1. The precise shape of the formation 102, while illustrated as somewhat rectangular, will in actuality be determined by a variety of factors such as faulting, depositional environment, differential compaction, location of an impervious rock layer above the formation 102, and angle of the impervious rock layer. One or more boreholes 106 and 108 may be drilled from the surface 100 into the formation 102. The illustrative boreholes are displayed as vertical, but they can have any geometry, including boreholes where a portion of the borehole is horizontal. The illustrative boreholes 106 and 108 in FIG. 1 include wellheads 110 and 112, signifying that these illustrative boreholes 106 and 108 have already been completed; however, data regarding an underground formation can be gathered at any stage of creation of the borehole.

Before significant hydrocarbon extraction begins, the owner or operator may want to determine or devise a hydrocarbon extraction technique which results in the best overall drainage of the hydrocarbons from the formation 102. The hydrocarbon extraction technique may take many forms, such as drilling additional boreholes, withdrawing the hydrocarbons from particular portions of the formation 102 prior to other portions of the formation 102, and the use of secondary recovery fluid injection (e.g., water injection, natural gas injection, carbon dioxide injection). In order to select the extraction technique ultimately used, a plurality of extraction techniques and/or model parameters may be evaluated by use of a formation model.

Figure 2:
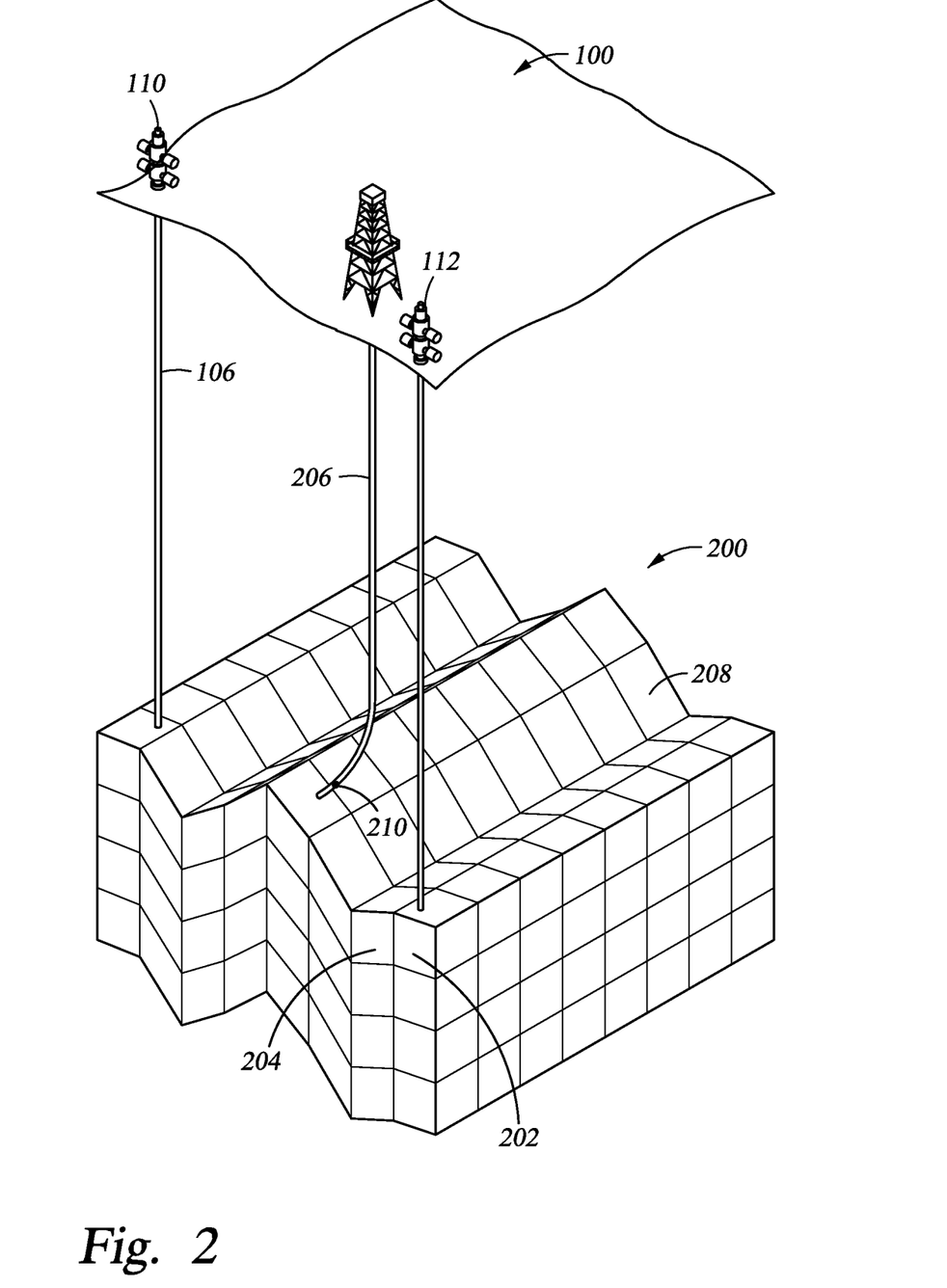
FIG. 2 shows a perspective view of a geocellular model that represents an underground formation in accordance with at least some embodiments.

In accordance with at least some embodiments some or all of an underground hydrocarbon bearing formation may be modeled by the use of a geocellular model. FIG. 2 shows a perspective view of an illustrative geocellular model. In particular, FIG. 2 shows the face 100, as well as a geocellular model 200 of the illustrative formation 102. As the name implies, a geocellular model comprises a plurality of cells, for example cell 202 and cell 204, where all the cells considered together approximate the physical extent of the formation 102 (or a relevant section). As shown in FIG. 2, in some cases the cells 202 and 204 are somewhat rectangular and have approximately equal volume; however, in other cases cells may equivalently have varying volumes and varying exterior shapes. For example, for cells corresponding to portions of the formation known to have significant hydrocarbon impregnation, the cell volumes may be relatively small so that hydrocarbon movement may be more accurately modeled or simulated. The cell volumes corresponding to locations in the formation that have very little hydrocarbon impregnation, or which are a great distance from planned or actual injection wells and/or extraction wells, may have larger volume as the precise hydrocarbon movement through these cells may have less of an impact on the overall simulation.

It is to be understood that each cell (e.g., cells 202 and 204) is a mathematical construct, not a physical construct. The illustration of FIG. 2 showing the model 200 under the face 100 is merely to orient the reader to the idea of a geocellular model representing or modeling a formation 102. Each cell "contains" information regarding the portion of the formation represented by that cell. For example, each cell may contain a value indicative of the porosity of the formation represented by the cell. Each cell may contain an indication of the permeability of the formation represented by the cell. Each cell may contain an indication of hydrocarbon saturation of a portion of the formation represented by the cell. Each cell may contain an indication of the oil-to-gas saturation of the portion of the formation represented by the cell. Using the model 200 then, response of the real formation 102 may be simulated for many different extraction techniques and/or model parameters. For example, the model 200 may be used to estimate the volume of fluid extracted from borehole 106 in response to pumping of a secondary recovery fluid into the formation through borehole 108.

Consider now the situation of actual borehole 206 drilled into the underlying hydrocarbon bearing formation after creation of the model 200, and where FIG. 2 illustrates the respective location within the model 200 of the actual borehole 206 in relation to the actual formation. Further consider that the upper surface 208 as illustrated by the model 200 at the location of the actual borehole 206 is different than the depth at which the upper surface of the actual formation is found at the location of the actual borehole 206, the actual depth as illustrated by actual datum 210. The situation of the actual depth of the top of the formation being different than the depth predicted by the model is discussed more fully with respect to FIG. 3.

Figure 3:
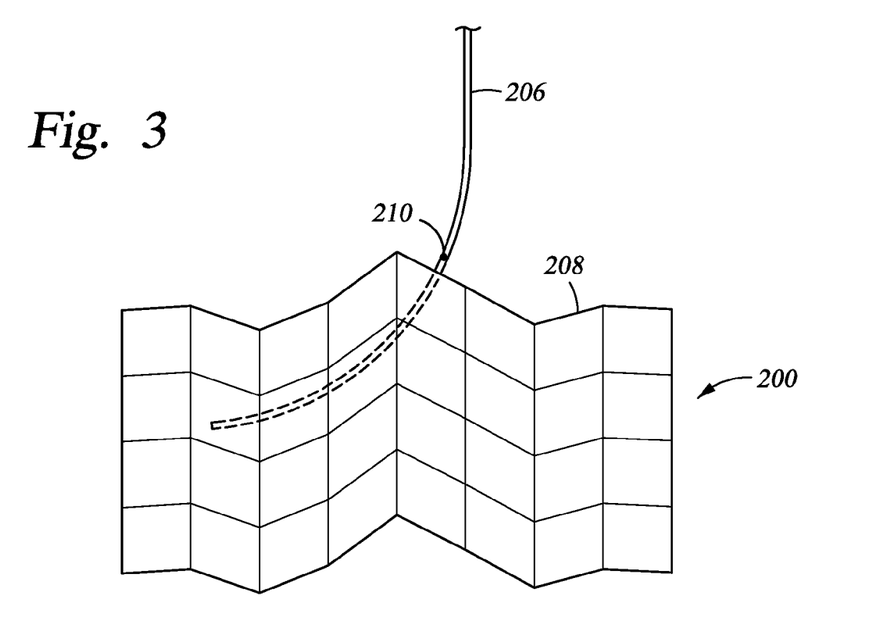
FIG. 3 shows a side elevation view of a geocellular model that represents an underground formation in accordance with at least some embodiments.

FIG. 3 shows a side elevation view of the geocellular model 200, with the number of cells reduced from that shown in FIG. 2 so as not to unduly complicate the discussion. In particular, FIG. 3 shows the actual borehole 206 in relation to the geocellular model 200. Associated with the actual borehole 206 is a datum 210 that indicates, in this illustration, an actual depth of the top surface of the underlying formation. In the example situation of FIG. 3, the actual depth 210 of the illustrative top surface of the formation as discovered in the actual borehole 206 is different (in this case at a shallower depth or higher elevation) than the top surface 208 predicted by the geocellular model 200. With the discrepancy between the predicted depth of the top surface 208 and the actual depth 210 measured within the actual borehole 208, an analyst may want to update the geocellular model 200 to take into account the actual depth 210. The balance of this discussion will be with respect to the two-dimensional view of FIG. 3, rather than the three-dimensional views of FIGS. 1 and 2, so as not to unduly complicate the drawings and the discussion. However, once understanding the description of how to update the geocellular model 200 with respect to the two-dimensional discussion, updating the geocellular model 200 in three-dimensions is also understood.

Figure 4:
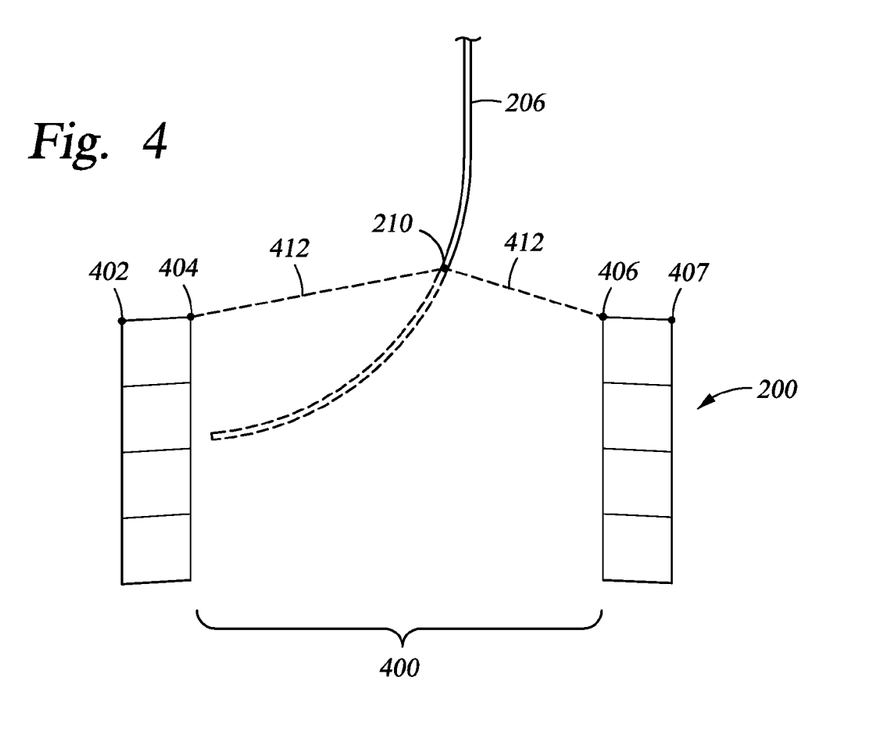
FIG. 4 shows a side elevation view of a geocellular model that represents an underground formation in accordance with at least some embodiments.

In accordance with the related art, updating the geocellular model 200 with the actual datum 210 from the actual borehole 206 involves discarding or deleting data from the geocellular model, and then interpolating a new upper surface from the remaining data along with the actual data 210. FIG. 4 illustrates such a situation. In particular, a plurality of cells within the geocellular model 200 are removed or deleted, as indicated by gap 400. Data points from the remaining cells (e.g., points 402, 404, 406, and 407) along with the actual datum 210 from the actual borehole 206 are then used to interpolate a new upper surface in the location of the removed cells. An illustrative new surface using the related art technique is shown in FIG. 4 as dashed line 412. Thus, while the newly calculated top of the geocellular model 200 does conform to the actual datum 210 and the data points that remain after removal of cells, a significant amount of information regarding the structure of the geocellular model (and therefore the underlying hydrocarbon bearing earth formation) has been lost. In the particular example illustrated with reference to FIGS. 3 and 4, the undulating nature of the geocellular model 200 has been lost.

Figure 5:
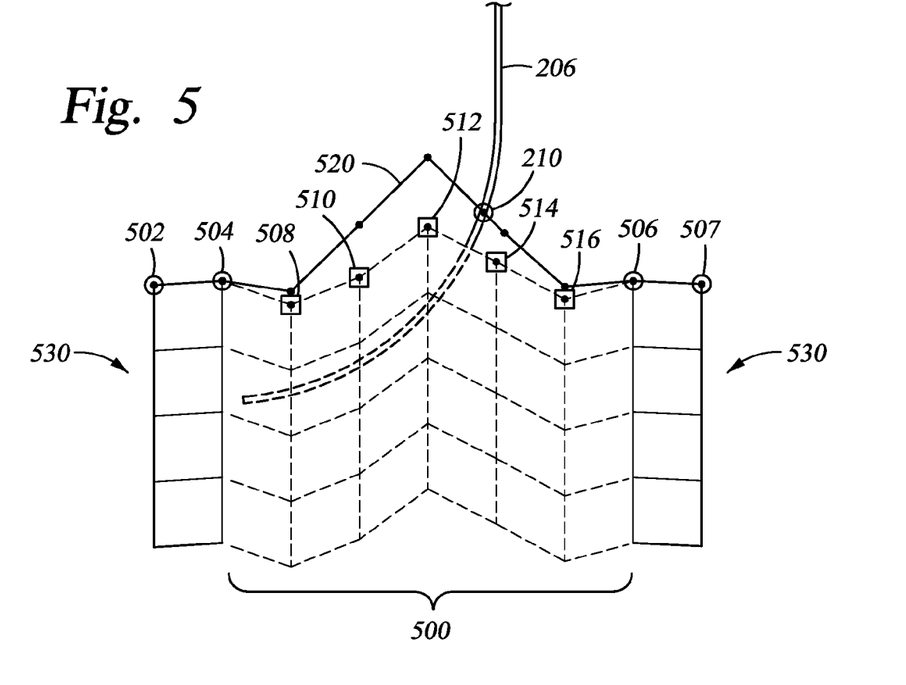
FIG. 5 shows a side elevation view of a geocellular model that represents an underground formation in accordance with at least some embodiments.

In accordance with the various embodiments, when small or localized regions of a geocellular model need to be updated, based on actual data from an actual borehole, the updating process takes into account data from cells within the geocellular model that are to be removed. Taking into account data from cells to be removed helps preserve the nature of the surface represented by the geocellular model while also adjusting the model to account for the actual data. FIG. 5 shows a side elevational view of the geocellular model 200 in order to describe updating the geocellular model in accordance with the various embodiments. In particular, a plurality of cells are designated for removal, for example the cells in the column spanning location 500. The number of cells designated for removal may change for each particular situation. For example, if the actual datum 210 is only slightly different than the top of the formation indicated by the model, only a few relatively close cells may be designated for removal. On the other hand, if significant differences exist between the actual datum 210 and the top of the formation indicated by the model, a greater number of cells may be designated for removal. Furthermore, even in cases where only a slight difference between actual datum 210 and the top of the formation indicated by the model is indicated, a significant number of cells may be designated for removal when the modeled top of the formation has significant topographical changes in the vicinity of the actual datum 210. Similarly, if the modeled top of the formation is relatively flat, fewer cells may be designated for removal. In some cases, an analyst taking into account factors such as the difference in depth between the measured and modeled parameter, as well as the amount of topographical change of the modeled parameter in the vicinity of the newly actual datum, may select or determine the number of cells around the location to be designated for removal. That is, the analyst may be queried for and provide an indication of the extent of cells to be removed. Thus, a program may receive the indication of the extent of cells to be removed. In yet still further embodiments, the software performing the update to the geocellular model may automatically designate cells for removal based on similar considerations.

Regardless of the precise mechanism by which cells are designated for removal, in accordance with at least some embodiments the data associated with the cells designated for removal is not immediately discarded. Rather, the data associated with the cells designated for removal is retained temporarily either within the geocellular model 200, or some other location where the data is available. In FIG. 5, the cells of the geocellular model 200 designated for removal are shown with at least three sides in dashed line form.

In accordance with a particular embodiment, updating the geocellular model 200 with respect to the newly acquired actual datum 210 from the actual borehole 206 involves calculating a new surface for the geocellular model 200 in the vicinity corresponding to the location of the actual borehole. In the illustrative embodiments the new surface is an upper surface, but any surface may be equivalently determined. Unlike related-art techniques which do not take into account data associated with removed cells, in accordance with the various embodiments the new surface is calculated using not only the actual datum 210 and data from cells not selected for removal, but also data from cells designated for removal.

One way to conceptualize the distinction between the various data types is a dichotomy between "hard data" and "soft data." Hard data is data to which the new surface intersects (i.e., the new surface passes through locations indicated by the hard data), and soft data is used in calculating the new surface, but the newly calculated surface need not intersect the locations indicated by the soft data. In the illustrative case of FIG. 5, and using the example dichotomy between hard data and soft data, the hard data are illustrated by dots enclosed within a circle, such as hard data 502, 504, 506, and 507, along with the actual datum 210. The newly calculated surface will intersect these hard data points. The soft data used in calculating the new surface are illustrated in FIG. 5 by dots surrounded by a square, such as the data associated with points 508, 510, 512, 514, and 516. In the example of FIG. 5, the hard data points 502, 504, 506, and 507, and the soft data points 508, 510, 512, 514 and 516 represent locations of the corners of the cells at the top of the geocellular model; however, the data points may equivalently represent centers of the cells. Using both the hard data and the soft data (i.e., data associated with cells designated for removal, data associated with cells not selected for removal and the actual data from the actual borehole) a new surface is calculated or interpolated. For example, using both the hard data and soft data, the new surface 520 may be calculated. The illustrative new surface 520 not only adheres to the hard data, but also retains the illustrative undulating pattern previously exhibited by the top of the geocellular model 200.

Any suitable interpolation technique may be used to calculate the illustrative new surface 520. For example, in a particular embodiment a series of variograms are calculated with respect to the hard and soft data. A variogram is a statistical function that is indicative of the difference between data points as a function of distance and direction (azimuth). Once the variograms have been calculated, the data points representing new surface 520 may be calculated using a co-kriging technique. One of ordinary skill in the art is aware of the co-kriging technique, and now understanding application of the co-kriging technique to the situation of updating a geocellular model on a regional scale could apply the co-kriging to determine the surface 520.

In the example situation of FIG. 5, the actual borehole 206 does not extend completely through the actual formation, and thus does not extend completely through the model 200. In situations where the actual data includes a new actual datum for the measured bottom surface of the model, the techniques discussed above may be likewise used to calculate a new bottom surface. Further still, the techniques may be used calculate a new surface for any geological boundary of interest associated with the model. In the absence of new data regarding the bottom surface of the model, either the current bottom surface may be retained (i.e., assumed to be the same), or the overall thickness of the modeled formation at each horizontal (X,Y) location may be assumed to be the same (but with the ability of that "thickness" to shift up or down in depth). The discussion starts with the assumption of the overall thickness at each horizontal location remaining the same.

In situations where the thickness of the overall model is assumed to remain the same in spite of the change in depth or elevation of the new surface, the new cells of the geocellular model will have the same thickness as the cells designated for removal. Thus, rebuilding the cell locations within the gap 500 involves "hanging" the new cells off the illustrative new surface 520. In the example situation of an upward shift in the top surface of the model, an assumption that the thickness remains unchanged results in a corresponding shift in the bottom surface of the geocellular model. The new cells of the geocellular model are not expressly shown in FIG. 5.

In other cases, however, it is assumed that the depth or elevation of the bottom surface of the model remains unchanged. In such situations, the thickness of each new layer of cells within the gap 500 may be calculated using an interpolation technique. In a particular embodiment, the interpolation regarding the thickness of a layer with new cells also uses hard and soft data. The hard data in this example is data regarding thickness of each layer of cells not selected for removal, and the new overall thickness. The soft data comprises the thickness of each layer of cells designated for removal and the original overall thickness. In this particular embodiment then, for each layer the variogram for thickness interpolation is taken from the variogram of the original overall thickness. Using the variogram, a co-kriging technique may be used to interpolate a thickness of each layer.

Consider, as an example, layer 530. A variogram is determined that relates the original overall thickness to the original thickness of the layer. Using the variogram, a co-kriging technique may be used which also takes into account the hard data associated with thickness of the cells not designated for removal, thickness of cells designated for removal, and the new overall thickness. Once a new thickness is determined for the layer, new cells for the layer are "hung" from the new surface 520. The steps are repeated for each successive layer, with the new cells "hung" from the layer immediately above, until the all the new cells of the updated geocellular model have been created.

The discussion of the various embodiments to this point has been with respect to depth data associated with cells of the geocellular model 200. That is, depth data associated with cells designated for removal may be used in calculating a new surface representing the top of a formation, and the thickness of new cells within each layer. However, the cells of a geocellular model also contain other information, such as modeled porosity values, modeled permeability values, modeled gas saturation values, and modeled water saturation values. Thus, the next step in updating the geocellular model may be to determine model parameters within each newly created cell.

Figure 6:
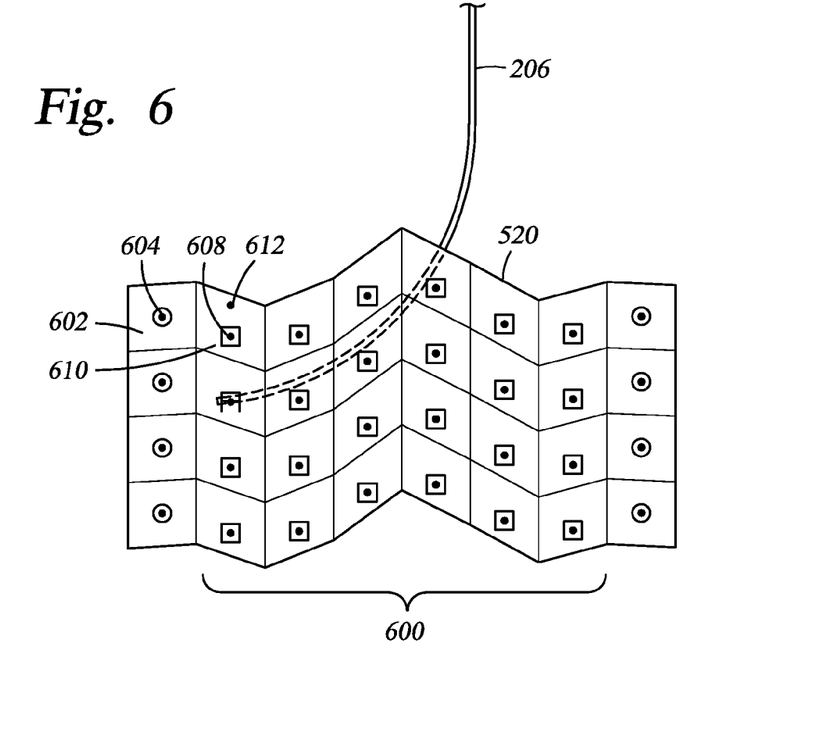
FIG. 6 shows a side elevation view of a geocellular model that represents an underground formation in accordance with at least some embodiments.

FIG. 6 shows a side elevational view of a partially updated geocellular model 200 in order to further describe updating the geocellular model in accordance with the various embodiments. In particular, FIG. 6 shows the illustrative new upper surface 520, along with the newly determined cells "hung" from the new surface, the new cells in the column defined by section 600. In accordance with at least some embodiments, the modeled parameters may be considered to reside at the center of the each cell. For example, illustrative cell 602, which cell was not designated for removal in the example steps discussed above, may have one or more modeled parameters illustrated by the dot 604 in the middle of the cell. Likewise, the cells designated for removal (not specifically shown in FIG. 6) also have modeled parameters at their respective locations, such as dot 608. Consistent with the hard and soft data dichotomy discussed above, modeled parameters for cells not designated for removal are shown enclosed by a circle, and modeled parameters for cells designated for removal are shown enclosed by a square.

Unlike related-art techniques which do not take into account modeled parameters for removed cells when calculating modeled parameters for newly created cells, in accordance with at least some embodiments the modeled parameters from cells designated for removal are used to determine modeled parameters for new cells. Consider, as an example, calculating modeled parameters for new cell 610, the new modeled parameters illustrated by dot 612 in the center of the cell 610. In accordance with a particular embodiment, interpolating the new modeled parameter takes into account not only modeled parameters associated with cells not selected for removal, but also modeled parameters from one or more cells to be removed, and any additional actual data (for example, parameters measured within borehole 206). The process is repeated for each cell of the newly created cells of the updated geocellular model.

Any suitable interpolation technique may be used to calculate the illustrative new modeled data within each newly create cell. For example, in a particular embodiment a series of variograms are calculated with respect to the surrounding hard data and soft data. Once the variograms have been calculated, the modeled parameter may be calculated using a co-kriging technique. Again, one of ordinary skill in the art is aware of the co-kriging technique, and now understanding application of the co-kriging technique to the situation of updating modeled parameters of a geocellular model could apply the co-kriging to determine modeled parameters within each newly created cell.

Once the modeled parameters for each newly created cell are determined, all the data associated with the cells designated for removal (i.e., both the location data and modeled parameters), may be removed from the geocellular model 200. If the data associated with the cells designated for removal have already been removed, then the data associated with the cells designated for removal may be discarded from its temporary storage location. Thus, the geocellular model 200 may be regionally updated to account for new actual data without the time and expense associated with recreating the entire geocellular model 200.

A few points are in order before proceeding. The updating discussed above can be accomplished without data sets normally used in creating geocellular models 200. For example, software packages that create geocellular models can utilize seismic data (such as seismic velocity data), as well as other predetermined horizons. By contrast, in its simplest form the methods discussed above may be used to regionally update a geocellular model when as little a single new datum of actual data is received. Stated otherwise, at least some of the various techniques update the geocellular model without using seismic data (such as seismic velocity data), without using seismic data used to initially create the geocellular model (again, such as seismic velocity data), and without using the horizons used initially to create the geocellular model.

Figure 7:
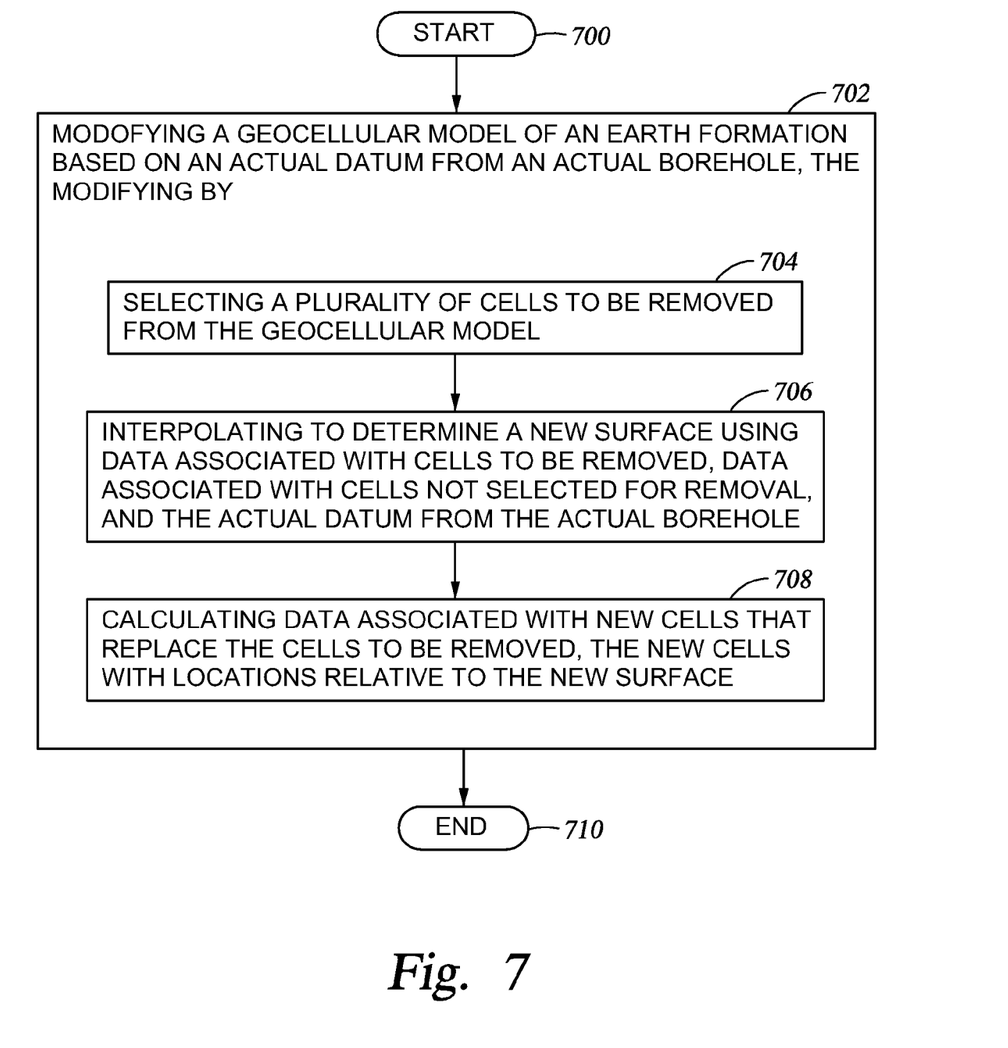
FIG. 7 shows a method in accordance with at least some embodiments.

FIG. 7 shows a method (which may be implemented as software) in accordance with at least some embodiments. The method starts (block 700) and comprises modifying a geocellular model of an earth formation based on an actual datum from an actual borehole (block 702). The modifying by: selecting a plurality of cells to be removed from the geocellular model (block 704); interpolating to determine a new surface using data associated with cells to be removed, data associated with cells not selected for removal, and the actual datum from the actual borehole (block 706); and calculating data associated with new cells that replace the cells to be removed, the new cells with locations relative to the new surface (block 708). Thereafter, the method ends (block 710).

Figure 8:
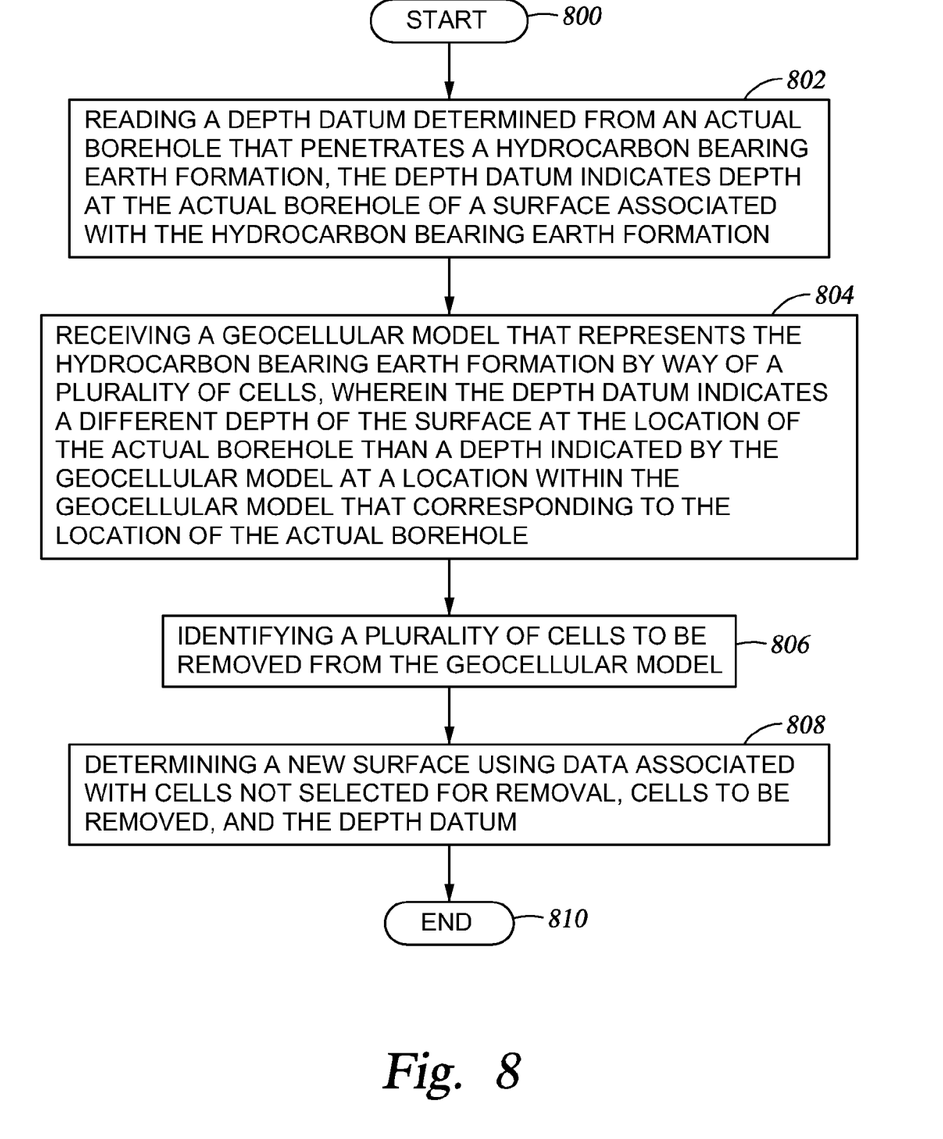
FIG. 8 shows a method in accordance with at least some embodiments.

FIG. 8 shows a method (which may be implemented as software) in accordance with at least some embodiments. In particular, the method starts (block 800) and comprises: reading a depth datum determined from an actual borehole that penetrates a hydrocarbon bearing earth formation, the depth datum indicates depth at the actual borehole of a surface associated with the hydrocarbon bearing earth formation (block 802); receiving a geocellular model that represents the hydrocarbon bearing earth formation by way of a plurality of cells, wherein the depth datum indicates a different depth of the surface at the location of the actual borehole than a depth indicated by the geocellular model at a location within the geocellular model that corresponding to the location of the actual borehole (block 804); identifying a plurality of cells to be removed from the geocellular model (block 806); and determining a new surface using data associated with cells not selected for removal, cells to be removed, and the depth datum (block 808). Thereafter, the method ends (block 810).

Figure 9:
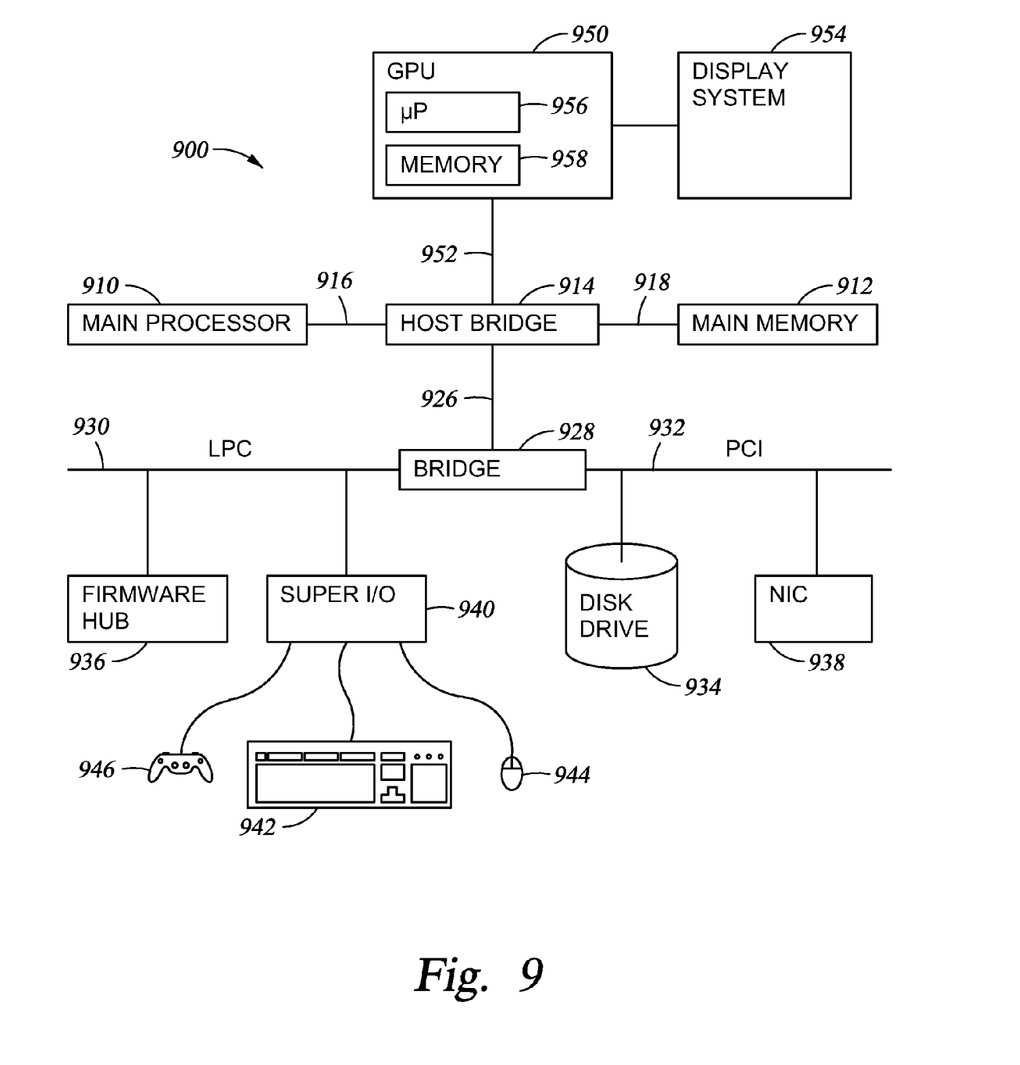
FIG. 9 shows a computer system in accordance with at least some embodiments.

FIG. 9 illustrates a computer system 900 in accordance with at least some embodiments. In particular, computer system 900 comprises a main processor 910 coupled to a main memory array 912, and various other peripheral computer system components, through integrated host bridge 914. The main processor 910 may be a single processor core device, or a processor implementing multiple processor cores. Furthermore, computer system 900 may implement multiple main processors 910. The main processor 910 couples to the host bridge 914 by way of a host bus 916 or the host bridge 914 may be integrated into the main processor 910. Thus, the computer system 900 may implement other bus configurations or bus-bridges in addition to, or in place of, those shown in FIG. 9.

The main memory 912 couples to the host bridge 914 through a memory bus 918. Thus, the host bridge 914 comprises a memory control unit that controls transactions to the main memory 912 by asserting control signals for memory accesses. In other embodiments, the main processor 910 directly implements a memory control unit, and the main memory 912 may couple directly to the main processor 910. The main memory 912 functions as the working memory for the main processor 910 and comprises a memory device or array of memory devices in which programs, instructions and data are stored. The main memory 912 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 912 is an example of a non-transitory computer-readable medium storing programs and instructions, and other examples are disk drives and flash memory devices.

The illustrative computer system 900 also comprises a second bridge 928 that bridges the primary expansion bus 926 to various secondary expansion buses, such as a low pin count (LPC) bus 930 and peripheral components interconnect (PCI) bus 932. Various other secondary expansion buses may be supported by the bridge device 928. In accordance with some embodiments, the bridge device 928 comprises an Input/Output Controller Hub (ICH) manufactured by Intel Corporation, and thus the primary expansion bus 926 comprises a Hub-link bus, which is a proprietary bus of the Intel Corporation. However, computer system 900 is not limited to any particular chip set manufacturer, and thus bridge devices and expansion bus protocols from other manufacturers may be equivalently used.

Firmware hub 936 couples to the bridge device 928 by way of the LPC bus 930. The firmware hub 936 comprises read-only memory (ROM) which contains software programs executable by the main processor 910. The software programs comprise programs executed during and just after power on self tests (POST) procedures as well as memory reference code. The POST procedures and memory reference code perform various functions within the computer system before control of the computer system is turned over to the operating system.

The computer system 900 further comprises a network interface card (NIC) 938 illustratively coupled to the PCI bus 932. The NIC 938 acts as to couple the computer system 900 to a communication network, such the Internet. The computer system 900 may receive geocellular models over the NIC, receiving actual data upon which updates to the geocellular model may be based, and/or send updated geocellular models to other computer systems over the NIC 938.

Still referring to FIG. 9, computer system 900 may further comprise a super input/output (I/O) controller 940 coupled to the bridge 928 by way of the LPC bus 930. The Super I/O controller 940 controls many computer system functions, for example interfacing with various input and output devices such as a keyboard 942, a pointing device 944 (e.g., mouse), game controller 946, various serial ports, floppy drives and disk drives. The super I/O controller 940 is often referred to as "super" because of the many I/O functions it performs.

The computer system 900 further comprises a graphics processing unit (GPU) 950 coupled to the host bridge 914 by way of bus 952, such as a PCI Express (PCI-E) bus or Advanced Graphics Processing (AGP) bus. Other bus systems, including after-developed bus systems, may be equivalently used. Moreover, the graphics processing unit 950 may alternatively couple to the primary expansion bus 926, or one of the secondary expansion buses (e.g., PCI bus 932). The graphics processing unit 950 couples to a display system 954 which may comprise any suitable electronic display device or multiple distinct display devices, upon which any image or text can be displayed. The graphics processing unit 950 comprises an onboard processor 956, as well as onboard memory 958. The processor 956 may thus perform graphics processing, as commanded by the main processor 910. Moreover, the memory 958 may be significant, on the order of several hundred gigabytes or more. Thus, once commanded by the main processor 910, the graphics processing unit 950 may perform significant calculations regarding graphics to be displayed on the display system, and ultimately display such graphics, without further input or assistance of the main processor 910.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, the newly acquired data may be a fictional creation of an analyst to test various "what if" scenarios with respect to the model. It is intended that the following claims be interpreted to embrace all such variations and modifications.

What is claimed is:

1. A computer-implemented method for modifying a geocellular model of an earth formation, the method comprising:

determining a difference between an actual depth of the earth formation's surface measured at a location of an actual borehole drilled into the earth formation and a predicted depth according to an initial surface of the geocellular model, the geocellular model including a plurality of cells representing different portions of the earth formation, each cell including data for a portion of the earth formation corresponding to the cell's location within the geocellular model;

designating cells within the plurality of cells for removal from a selected region of the geocellular model, based in part on the difference determined between the predicted depth and the actual depth of the earth formation's surface at the location of the actual borehole, the selected region including cells designated for removal from different layers of the geocellular model extending from the initial surface;

interpolating a new surface for the geocellular model using data associated with the cells designated for removal, data associated with cells of the geocellular model not designated for removal, and the actual depth measured at the actual borehole;

calculating data for new cells that will replace the designated cells at locations within the selected region of the geocellular model that are adjusted relative to the new surface; and updating the selected region of the geocellular model by removing and replacing the designated cells associated with the initial surface with the new cells associated with the new surface and the calculated data.

2. The method of claim 1, wherein interpolating the new surface comprises:

calculating variograms as between data from the cells designated for removal, data from cells not designated for removal, and the actual depth of the earth formation's surface at the actual borehole; and interpolating the new surface using the calculated variograms.

3. The method of claim 1, wherein the geocellular model was initially created using seismic data, and the geocellular model is modified using data that does not include the seismic data used to create the geocellular model.

4. The method of claim 1, wherein the initial surface and the new surface represent different top surfaces of the geocellular model.

5. The method of claim 1, wherein updating the selected region of the geocellular model comprises:

removing data associated with each of the cells designated for removal from the selected region of the geocellular model; and replacing the removed data with the calculated data associated with the new cells.

6. The method of claim 1, wherein designating further comprises designating cells within the plurality of cells for removal from the selected region of the geocellular model based on an amount of topographical change associated with the initial surface of the geocellular model in an area near the actual borehole's corresponding location.

7. The method of claim 6, wherein the new surface of the modified geocellular model retains the topographical change associated with the initial surface of the geocellular model, and each of the new cells retain a thickness of the corresponding cell that it replaces.

8. A computer system for modifying a geocellular model of an earth formation, the system comprising:

a processor;

a memory coupled to the processor;

wherein the memory stores a program that, when executed by the processor, causes the processor to:

determine a difference between an actual depth of the earth formation's surface measured at a location of an actual borehole drilled into the earth formation and a predicted depth according to an initial surface of the geocellular model, the geocellular model including a plurality of cells representing different portions of the earth formation, each cell including data for a portion of the earth formation corresponding to the cell's location within the geocellular model;

designate cells within the plurality of cells for removal from a selected region of the geocellular model, based in part on the difference determined between the predicted depth and the actual depth of the earth formation's surface at the location of the actual borehole, the selected region including cells designated for removal from different layers of the geocellular model extending from the initial surface;

interpolate a new surface for the geocellular model using data associated with cells not selected for removal, the cells designated for removal, and the actual depth measured at the actual borehole;

calculate data for new cells that will replace the designated cells at locations within the selected region of the geocellular model that are adjusted relative to the new surface; and update the selected region of the geocellular model by removing and replacing the designated cells associated with the initial surface with the new cells associated with the new surface and the calculated data.

9. The computer system of claim 8 wherein cells within the plurality of cells are designated for removal from the selected region of the geocellular model based on user input received via an input/output (I/O) interface of the system, the user input indicating an extent of cells to be removed from the geocellular model relative to a corresponding location of the actual borehole.

10. The computer system of claim 8 wherein the program further causes the processor to:

calculate variograms as between data from the cells designated for removal, data from cells not designated for removal, and the actual depth of the earth formation's surface; and interpolate the new surface using the variograms.

11. The computer system of claim 8 wherein the program causes the processor to determine without using seismic data.

12. The computer system of claim 11 wherein the program further causes the processor to determine without using horizons used to create the geocellular model.

13. The computer system of claim 8 wherein the program further causes the processor to determine without using horizons used to create the geocellular model.

14. The computer system of claim 8 wherein the initial surface and the new surface represent different top surfaces of the geocellular model.

15. The computer system of claim 8 wherein the new surface retains a topographical change associated with the initial surface of the geocellular model, and each of the new cells retain a thickness of the corresponding cell that it replaces.

16. The computer system of claim 15, wherein the program further causes the processor to:

remove data associated with each of the cells designated for removal from the selected region of the geocellular model; and replace the removed data with the calculated data associated with the new cells.

17. A non-transitory computer-readable medium storing a program for modifying a geocellular model of an earth formation that, when executed by a processor, causes the processor to:

determine a difference between an actual depth of the earth formation's surface measured at a location of an actual borehole drilled into the earth formation and a predicted depth according to an initial surface of the geocellular model, the geocellular model including a plurality of cells representing different portions of the earth formation, each cell including data for a portion of the earth formation corresponding to the cell's location within the geocellular model;

designate cells within the plurality of cells for removal from a selected region of the geocellular model, based in part on the difference determined between the predicted depth and the actual depth of the earth formation's surface at the location of the actual borehole, the selected region including cells designated for removal from different layers of the geocellular model extending from the initial surface;

interpolate a new surface for the geocellular model using data associated with cells not selected for removal, the cells designated for removal, and the actual depth measured at the actual borehole;

calculate data for new cells that will replace the designated cells at locations within the selected region of the geocellular model that are adjusted relative to the new surface; and update the selected region of the geocellular model by removing and replacing the designated cells associated with the initial surface with the new cells associated with the new surface and the calculated data.

18. The non-transitory computer-readable medium of claim 17 wherein the program causes the processor to:

calculate variograms as between data from the cells designated for removal, data from cells not designated for removal, and the actual depth of the earth formation's surface; and interpolate the new surface using the variograms.

19. The non-transitory computer-readable medium of claim 17 wherein the program further causes the processor to modify without using seismic data.

20. The non-transitory computer-readable medium of claim 19 wherein the program further causes the processor to modify without using horizons used to create the geocellular model.

21. The non-transitory computer-readable medium of claim 17 wherein the program further causes the processor to modify without using horizons used to create geocellular model.

22. The non-transitory computer-readable medium of claim 17 wherein the new surface and the initial surface represent different top surfaces of the geocellular model.

23. The non-transitory computer-readable medium of claim 17, wherein the program further causes the processor to:

remove data associated with each of the cells designated for removal from the selected region of the geocellular model; and replace the removed data with the calculated data associated with the new cells.

* * * * *